United States Patent [19]
Barnes
[11] 3,723,897
[45] Mar. 27, 1973

[54] AGC CIRCUIT TO MAINTAIN AMPLIFICATION AT A FIXED LEVEL BETWEEN SPEECH BURSTS

[75] Inventor: George John Preston Barnes, Harlow, England

[73] Assignee: International Standard Electric Corporation, New York, N.Y.

[22] Filed: June 30, 1971

[21] Appl. No.: 158,279

[30] Foreign Application Priority Data

July 29, 1970 Great Britain....................36,704/70

[52] U.S. Cl. ....................330/29, 330/141, 330/145
[51] Int. Cl. ............................................H03g 3/30
[58] Field of Search................330/29, 139, 141, 145; 325/319, 410, 413; 179/1 A, 1 P

[56] References Cited

UNITED STATES PATENTS

| | | | |
|---|---|---|---|
| 3,260,957 | 7/1966 | Kaiser et al. | 330/134 |
| 3,441,748 | 4/1969 | Werner | 330/145 UX |
| 3,036,276 | 5/1962 | Brown | 330/139 X |
| 3,496,481 | 2/1970 | Torick et al. | 330/141 X |
| 3,441,866 | 4/1969 | Barber et al. | 330/141 X |

*Primary Examiner*—Roy Lake
*Assistant Examiner*—James B. Mullins
*Attorney*—C. Cornell Remsen, Jr. et al.

[57] ABSTRACT

An AGC circuit for loudspeaking telephones is disclosed in which the setting of the amplifier is, in effect, "frozen" during gaps in speech at the level reached in the last speech burst. This avoids the undesirable effects on AGC systems of surges due to speech commencement.

4 Claims, 2 Drawing Figures

Inventor

George John Preston Barnes

By O. B. Warner

Attorney

AGC CIRCUIT TO MAINTAIN AMPLIFICATION AT A FIXED LEVEL BETWEEN SPEECH BURSTS

This invention relates to an automatic gain control circuit, which is especially suitable for, but by no means limited to, use with loudspeaking telephones.

Automatic Gain Control (AGC) circuits are well known, and a difficulty associated with their use arises when signals are punctuated by long pauses. Thus in a four wire system, normally signals are transmitted in one direction only at any time, so that an AGC circuit in one or other signal path has relatively long periods without a signal to adjust. In the simpler type of AGC circuit this causes the gain to be adjusted to be high during signal pauses, thus amplifying any noise in the signal channel. Also at the onset of a new signal various transient effects occur, the magnitude of which depends on the complexity of the circuit in use, and the values chosen for the various time constants.

An object of the invention is to provide an AGC circuit in which the above difficulties are minimized or overcome.

According to the present invention, there is provided an automatic gain control circuit for a signal amplifier, which includes a comparator adapted to compare the amplitude of the output of the amplifier with a reference signal and to emit an error signal whose parameters depend on the relation between the output and reference signal amplitudes, a connection including a gate circuit from said comparator to said amplifier via which when the gate circuit is open the gain of the amplifier can be adjusted, the gain being increased when the amplifier output falls and vice-versa, and detection means adapted to detect when a signal is present at the input to said amplifier and to maintain said gate circuit open only when a signal is present, the arrangement being such that when a signal being received ends said detection means responds to said signal ending to close said gate, whereafter the gain of the amplifier is maintained at or near the level to which it was last set from said comparator via said gate circuit.

Figure 1:
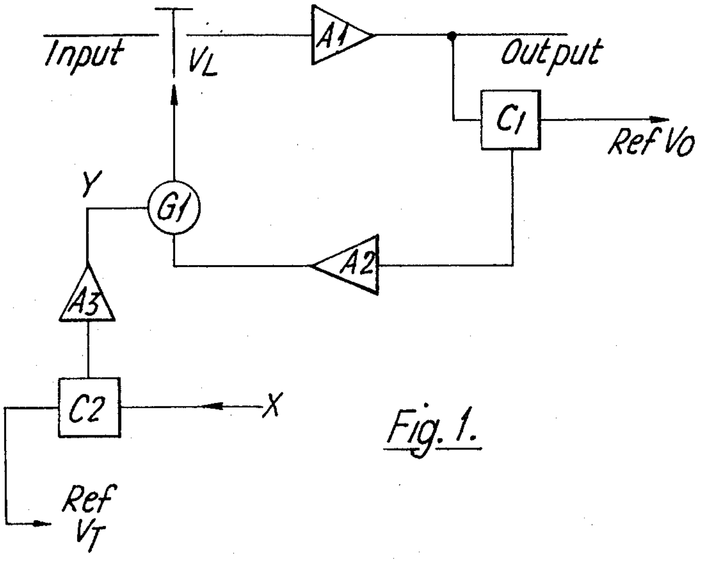
Figure 2:
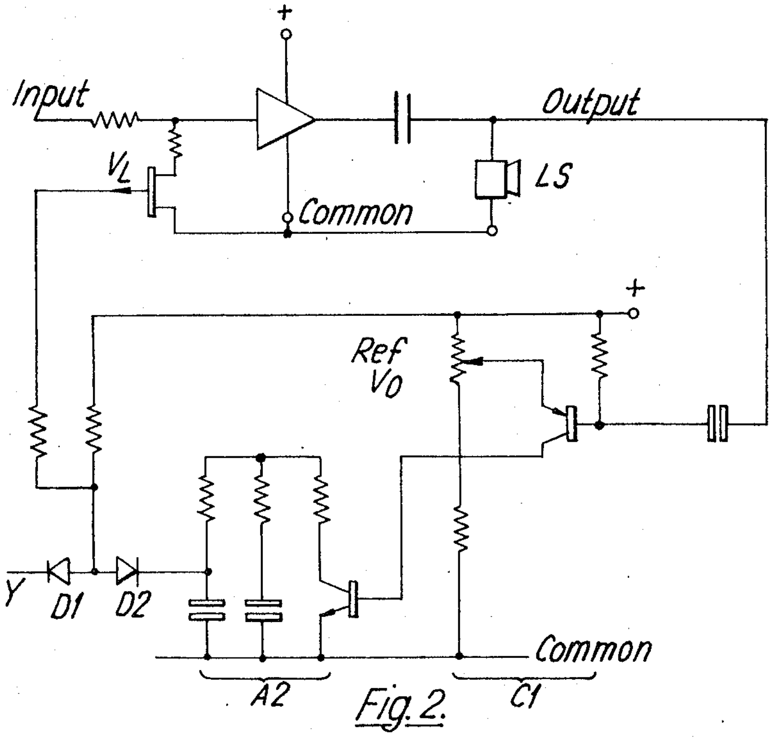

An embodiment of the invention will now be described with reference to the drawing, in which FIG. 1 is a schematic of the novel invention, while FIG. 2 is a more detailed circuit thereof, as applied to a loudspeaking telephone.

In FIG. 1, the signal path is shown from input to output passing through a variolosser (i.e. a device whose attenuation can be controlled) VL and an amplifier A1. It would also be possible to include the variolosser in the feedback path of the amplifier. At the output of the amplifier the signal is compared in comparator C1, with a reference level Vo (which may be variable and if it differs from the reference an error signal is passed via amplifier A2 and gate G1 (assumed open) to the variolosser control point such that an adjustment is made to the variolosser attenuation in a sense such that the output signal voltage more closely approaches the output reference voltage Vo.

Variolosser VL has properties such that when the gate G1 is closed, the attenuation value last set is maintained or frozen. Gate G1 is operated by a threshold detector formed by a comparator C2 and an amplifier A3, the signal at X being compared by C2 with the reference threshold VT. When the level at X exceeds VT, gate G1 is opened and control of the variolosser VL may take place. X may be connected to the signal input or some other convenient point, such that when a signal in the channel VL–A1 is absent no adjustment to VL takes place, and the overall gain is frozen at the last value before the signal at X falls below the threshold VT.

In loudspeaking telephone systems with voice switching, a threshold detector is normally used, in which case the gate G1 is connected from point Y to the switching logic, such that G1 is open when the set is receiving and closed when it is not. In this way any transients associated with the onset of speech are confined to the very first received signal from the line.

Referring now to the more detailed FIG. 2, in the receiving condition, with a positive signal at point Y, in which case diode D1 is non-conducting, and zero input signal, the gate FET VL drifts towards the positive power supply rail with time constants determined by the resistors and capacitors associated with amplifier A2. Immediately a signal is received and amplified through A1, and which exceeds at the output the reference voltage set at V*o*, amplifier A2 operates through diode D2 to reduce the positive voltage on the gate electrode of VL, which causes the FET to conduct and reduce the size of the input signal. Time constants associated with the switching on of VL are set by the R and C components in amplifier A2. Changes in signal level with respect to the reference level cause corresponding changes in the output of the comparator which in turn adjusts the conduction of VL, and hence the loss which it introduces.

If the set changes from the receiving condition the potential at point Y is grounded, so diode D1 conducts and renders the FET VL fully conducting, switching in a fixed loss for variolosser VL. At the same time, D2 is switched to its non-conducting state and amplifier A2 is switched off due to the reduced level of signal at the output of amplifier A1 and comparator C1. Hence the capacitors associated with amplifier A2 retain the charge they had on them just prior to point Y becoming grounded. This is only true, of course, if leakage resistances in D2, the transistor(s) in A2, and the capacitors themselves are sufficiently high. Assuming that the charge remains, then when the potential at point Y again goes positive when the set goes to the receiving condition, the gain is still set at the value last established and any new transients are kept to a minimum.

A particular advantage of this form of the circuit is that the variolosser VL acts both as switched variolosser in the normal voice switching function, and as a variable attenuator for the AGC function.

It is to be understood that the foregoing description of specific examples of this invention is not to be considered as a limitation of its scope.

I claim:

1. An automatic gain control circuit for a signal amplifier comprising a first amplifier stage, a comparator stage coupled to the first amplifier stage and to an adjustable reference signal for comparing the amplitude of the output of the first amplifier stage with the reference signal and providing an error signal whose parameters depend on the relation between the amplitudes of the amplifier output and the reference signal, a multistage controllable attenuation arrangement coupled in series between said comparator stage and the input to said first amplifier stage, said arrangement including a second amplifier stage, a controllable attenuation device and a gate circuit coupled therebetween, said arrangement providing a path through which the gain of the first amplifier stage can be adjusted when said gate circuit is opened, the gain being increased when the output of the first amplifier stage falls and vice-versa, and means for determining the presence of a signal at the input to said first amplifier stage and for maintaining said gate circuit open when a signal is present, said determining means responding to the termination of signal at said first amplifier stage input to close said gate, the arrangement of said gate circuit being such as to inhibit further changes in attenuation of said controllable attenuation device when in the closed state, said second amplifier stage having means for retaining, upon said gate circuit achieving the closed state, the control level of the attenuation setting of the attenuation device existing at gate-closing, for application to said controllable attenuation device upon reopening of said gate circuit, whereby the gain of the first amplifier is maintained at or near the level to which it was last set from said comparator, and said controllable attenuation device is thereby arranged to be both a switched device and a variable attenuator.

2. The circuit as claimed in claim 1, in which said controllable attenuation device is a FET having a source-drain path connected between the input to said first amplifier stage and ground, the gain being controlled by controlling the gate-source voltage, of said FET.

3. The circuit as claimed in claim 1, in which said comparator includes a transistor to the base of which the output of the first amplifier stage is connected, and a connection from the emitter of said transistor to the slider of a potentiometer, whereby the value of said reference signal can be adjusted.

4. The circuit as claimed in claim 1, in which said detection means includes a further comparator which compares the input level of said first amplifier stage with a further reference source.

* * * * *